(12) United States Patent
Ikeuchi et al.

(10) Patent No.: US 6,282,216 B1
(45) Date of Patent: Aug. 28, 2001

(54) BURST MODE OPTICAL TRANSMITTER CIRCUIT

(75) Inventors: Tadashi Ikeuchi; Tadao Inoue, both of Kawasaki; Toru Matsuyama; Toshiyuki Takauji, both of Sapporo; Norio Ueno, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/471,370

(22) Filed: Dec. 23, 1999

(30) Foreign Application Priority Data

Mar. 19, 1999 (JP) .................................................. 11-075024

(51) Int. Cl.[7] ............................... H01S 3/13; H01S 3/04; H01S 3/00
(52) U.S. Cl. .................................. 372/29.015; 372/29.01; 372/29.011; 372/29.012; 372/34; 372/38.1; 372/38.01; 372/38.02; 372/38.04; 372/38.07
(58) Field of Search ..................................... 372/46, 29.01, 372/29.011, 29.012, 29.015, 34, 38.1, 38.01, 38.02, 38.03, 38.04, 38.07

(56) References Cited

U.S. PATENT DOCUMENTS

| | | | |
|---|---|---|---|
| 5,694,409 | * | 12/1997 | Taguchi .................................... 372/38 |
| 6,097,746 | * | 8/2000 | Noda et al. .............................. 372/38 |
| 6,118,798 | * | 9/2000 | Ema et al. ............................... 372/29 |
| 6,192,060 | * | 2/2001 | Kobayashi ........................ 372/38.01 |

\* cited by examiner

Primary Examiner—Teresa M. Arroyo
Assistant Examiner—James Menefee
(74) Attorney, Agent, or Firm—Staas & Halsey LLP

(57) ABSTRACT

A burst mode optical transmitter circuit comprises a semiconductor laser, a photodiode for monitoring the light output from the semiconductor laser, a current-voltage converting circuit for converting the current detected by the photodiode into a voltage, an APC amplifier, a holding circuit for holding, as a current control signal, the output signal from the APC amplifier, a driving circuit for supplying a driving current to the semiconductor laser according the current control signal from the holding circuit and the the data input in the burst mode, and a data interruption detecting circuit for detecting an interrupt period of the data input to the driving circuit to reset the holding circuit, in which the current control signal held in the hold circuit is reset by the reset signal, whereby a stable burst optical transmission can be performed stably with a simple construction.

36 Claims, 13 Drawing Sheets

BURST MODE OPTICAL TRANSMITTER CIRCUIT

BACKGROUND OF THE INVENTION

1. Field of the Invention

The present invention relates to a burst mode optical transmitter circuit for converting burst data into an optical signal to be transmitted.

With recent developments in multimedia communication techniques, optical communication of high speed and large capacity has been realized. In such an optical communication system, there are continuous data communication and burst data communication in a fiber-optic subscriber system. The present invention relates to a burst mode optical transmitter circuit for converting burst data into an optical signal to stably transmit the data.

2. Description of the Related Art

FIG. 15 is a diagram, for explaining a prior art example, in which 101 represents a semiconductor laser, 102 a monitoring photodiode, 103 a current-to-voltage converting circuit (I/V), 104 an automatic power control (APC) amplifier, 105 a driving circuit, 107 a holding circuit, D a diode, and C a capacitor.

The driving circuit 105 supplies a driving current to the semiconductor laser 101 according to input data DATA in the burst mode. The optical output of the semiconductor laser 101 is transmitted through a not-shown optical fiber to a receiving side. A part of the optical output is detected by the monitoring photodiode 102. The detected current is converted by the current-to-voltage converting circuit 103 into a voltage and is input into the APC amplifier 104. The APC amplifier 104 compares the signal output from the current-to-voltage converter 103 with a reference value and applies a signal corresponding to the difference obtained by the comparison to the holding circuit 107.

The holding circuit 107 includes a diode D and a capacitor C to constitute a peak hold circuit. The value held by the capacitor C is applied as a current control signal to the driving circuit 105 whereby, when the optical output from the semiconductor laser 101 becomes larger than a predetermined value, the driving current supplied from the driving circuit 105 to the semiconductor laser 101 is decreased and, in contrast, when the optical output from the semiconductor laser 101 becomes smaller than a predetermined value, the driving current from the driving circuit 105 to the semiconductor laser 101 is increased. Thus the optical output is stabilized.

During an interrupt period of the data DATA input in the burst mode, the current control signal is held in the capacitor C in the holding circuit 107. Accordingly, even when the data DATA is input, after the interrupt period, the output of the semiconductor laser 101 is immediately controlled to have a predetermined level so that an optical signal can be transmitted. That is, the holding circuit 107 holds the current control signal to be input into the driving circuit 105 during the interrupt period of the burst data.

The semiconductor laser 101 has a light output characteristic with respect to the driving current as shown in FIG. 16. Because of this fact, the optical output can be stabilized as mentioned before. However, the light output characteristic is such that when the ambient temperature T or the temperature of the semiconductor laser 101 itself is lowered to be T1 which is lower than T2 as illustrated, the optical output is greatly increased even when the driving current is the same. To cope with this, a temperature compensating circuit to compensate for the temperature characteristic has been proposed to be implemented into the circuit.

When burst data is converted into an optical signal and is transmitted, cases where the interrupt period of the burst data is relatively long may often occur. For example, when data DATA is input according to the burst mode as shown in FIG. 17, the LD current, i.e., the current to drive the semiconductor laser, is controlled by the above-mentioned control so that the optical output is made constant.

Then, when data is input again after an interrupt period of the data DATA, the ambient temperature may be changed, for instance, from day temperature to night temperature and so forth. In particular, when the temperature is lowered, and when the driving current is supplied from the driving circuit 105 to the semiconductor laser 101 based on the current control signal held in the holding circuit 107, there is a problem in that the optical output from the semiconductor laser 101 is greatly increased so that the semiconductor laser 101 is destroyed.

In another prior art, an APC circuit is provided in which an optical output from a semiconductor laser is monitored to be sampled and held, the held value is compared with a reference value, and the result of the comparison is input into a control voltage supplying unit. In such an APC circuit, it has been proposed to provide a temperature compensating current generating unit and a temperature compensating voltage generating unit as disclosed in Japanese Unexamined Patent Publication (Kokai) No. 9-260720. In this case, the current corresponding to the ambient temperature is generated from the temperature compensating current generating unit and is input into the temperature compensating voltage generating unit by which the current is converted into a voltage which is then input to the control voltage supplying unit. This APC circuit, however, has a problem of complex construction and therefore of being expensive.

In still another prior art, there has been provided an APC circuit in which an optical output from a semiconductor laser is monitored to be sampled and held, the held value is compared with a reference value, and the driving current of the semiconductor laser is controlled by the compared result. In this APC circuit, the sample and hold circuit is reset at the time of turning on or off of the power supply so as to prevent an erroneous operation of the APC circuit, as disclosed in Japanese Unexamined Patent Publication (Kokai) No. 5-131675. This prior art, however, does not relate to the transmission of burst data, and the above-mentioned problem which is caused when the temperature is changed in an interrupt period of the burst data, and the means to solve the problem are not disclosed in this prior art.

SUMMARY OF THE INVENTION

An object of the present invention is to provide a burst optical transmission apparatus in which the optical transmission can be performed stably with a simple construction even when the ambient temperature is changed during a relatively long interruption in burst data.

To attain the above object, there is provided, according to a first aspect of the present invention, a burst mode optical transmitter circuit comprising: a semiconductor laser for converting data input in a burst mode into an optical signal; a photodiode for monitoring the light output from the semiconductor laser; a current-voltage converting circuit for converting the current detected by the photodiode into a voltage; an APC amplifier for comparing the output signal from the current-voltage converting circuit with a reference value; a holding circuit for holding, as a current control signal, the output signal from the APC amplifier, and having a reset function to reset the held current control signal; a driving circuit for controlling, according to the current control signal held in the holding circuit and the data, the current to be supplied to the semiconductor laser; and a data interruption detecting circuit for detecting an interrupt period of the data input to the driving circuit to reset the holding circuit.

According to a second aspect of the present invention, the holding circuit may comprise a peak detecting circuit for detecting a peak value of the output signal from the APC amplifier, and a switching circuit for resetting the peak detecting circuit by the reset signal from the data interruption detecting circuit.

According to a third aspect of the present invention, the holding circuit may comprise a switching circuit for switching and holding the current control signal in response to the output signal from the APC amplifier and for switching and setting the current control signal to a reset value in response to a reset signal from the data interruption detecting circuit.

According to a fourth aspect of the present invention, the holding circuit is a digital circuit for converting the output signal from the APC amplifier into a digital signal, for holding the digital signal, and for resetting the held digital signal in response to a reset signal from the data interruption detecting circuit.

According to a fifth aspect of the present invention, the holding circuit may comprise a construction for holding a current control signal corresponding to the output signal from the APC amplifier, and for resetting the current control signal to an initial set value in response to a reset signal from the data interruption detecting circuit.

According to the sixth aspect of the present invention, the burst mode optical transmitter circuit may further comprise a timer activated by a reset signal from the data interruption detecting circuit to input the reset signal into the holding circuit after a predetermined time.

According to a seventh aspect of the present invention, the burst mode optical transmitter circuit may further comprise a clock interruption detecting circuit for detecting an interruption of a clock signal input to the driving circuit, and an OR circuit for providing a reset signal to be supplied to the holding circuit when at least one of a reset signal from the data interruption detecting circuit and a clock interruption detection signal from the clock interruption detecting circuit is input to the OR circuit.

According to an eighth aspect of the present invention, the burst mode optical transmitter circuit may further comprise a temperature change detecting circuit for detecting whether or not a temperature around the semiconductor laser has been changed within a predetermined period, and an AND circuit for providing a reset signal to the holding circuit only when both of the reset signal from the data interruption detecting circuit and the temperature change detection signal from the temperature change detecting circuit are input to the AND circuit.

BRIEF DESCRIPTION OF THE DRAWINGS

The above object and features of the present invention will be more clearly understood from the following description of the preferred embodiments when read with reference to the accompanying drawings, wherein.

DESCRIPTION OF THE PREFERRED EMBODIMENTS

Figure 1:
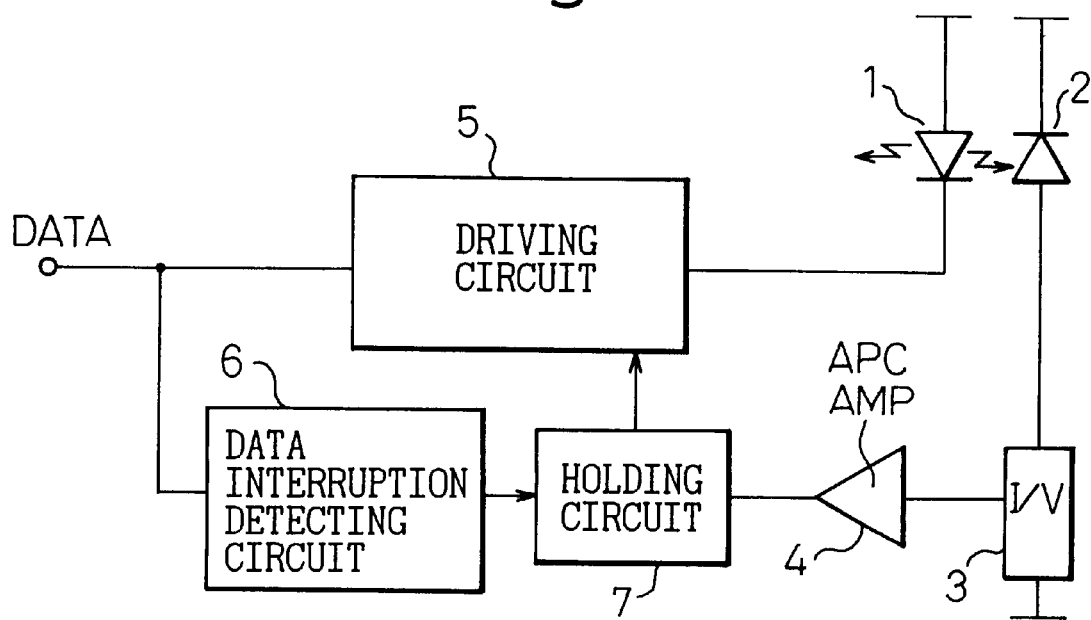
FIG. 1 is a block diagram of a burst light transmitting circuit according to a first embodiment of the present invention.

FIG. 1 is a block diagram of a burst light transmitting circuit according to a first embodiment of the present invention. In FIG. 1, reference numeral 1 denotes a semiconductor laser; 2 a monitoring photodiode; 3 a current-to-voltage converting circuit (I/V); 4 an automatic power control (APC) amplifier; 5 a driving circuit; 6 a data interruption detecting circuit; and 7 a holding circuit having a reset function. Note that an optical fiber optically coupled to the semiconductor laser 1 is not shown in the drawing for the purpose of simplicity.

Data DATA is input in a burst mode to the driving circuit 5. An optical output from the semiconductor laser 1 is detected as a current by the photodiode 2. The current from the photodiode 2 is converted into a voltage by the current-to-voltage converter 3 and is input into the APC amplifier 4. The APC amplifier 4 compares the voltage from the current-to voltage converter 3 with a reference voltage to obtain a difference signal between the voltage from the converter 3 and the reference voltage. The difference signal is input to the holding circuit 7. The holding circuit 7 samples and holds the difference voltage by means of a capacitor or the like to output a current control signal. The current control signal is input to the driving circuit 5.

When the data interruption detecting circuit 6 detects an interruption state of the data DATA to output a reset signal, the reset signal is input to the holding circuit 7 to reset the current control signal held in the holding circuit.

Accordingly, even when the interrupt period of the burst data is long so that the temperature change is large during the interrupt period, the contents held in the holding circuit 7 are reset and therefore the driving circuit 5 can control the driving current at an initial period of input of the data DATA to an initial condition. That is, even when the temperature is lowered during the interrupt period of the data DATA, the optical output from the semiconductor laser 1 can be automatically and surely prevented from becoming excessive.

Figure 2:
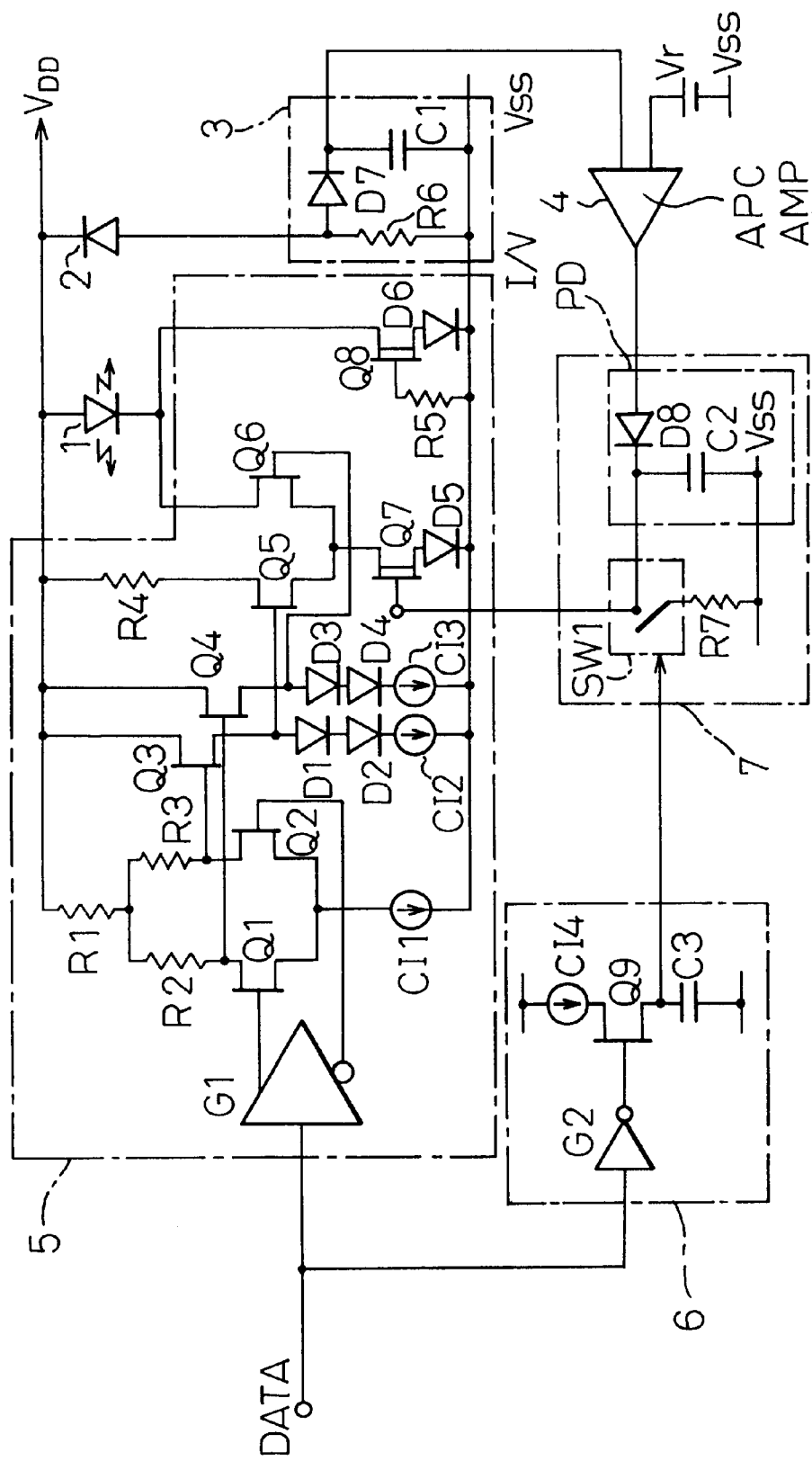
FIG. 2 is a circuit diagram of the burst light transmission circuit shown in FIG. 1.

FIG. 2 is a circuit diagram of the burst light transmission circuit shown in FIG. 1. In FIG. 2, the same reference numerals as those in FIG. 1 represent the same parts. Q1 to Q9 denote field effect transistors (FETS) in which Q7 and Q8 denote depletion type field effect transistors. Hereinafter, they are simply referred to as transistors. C1 to C3 denote capacitors; R1 to R7 resistors; CI1 to CI4 constant current sources; SW1 a switching circuit; $V_{DD}$ a power supply voltage; Vss a power supply voltage; Vr a reference voltage; G1 a gate circuit having complementary outputs; and G2 a gate circuit (inverter) having an inverted output.

The current-to-voltage converting circuit 3 includes, in the illustrated example, a resistor R6, a diode D7, and a capacitor C1. The circuit 3 detects the peak of the current output from the photodiode 2 which corresponds to the optical output from the semiconductor laser 1. The voltage across the terminals of the capacitor C1 is the voltage resulting from the current-to voltage conversion, and the voltage is applied to the APC amplifier 4. The APC amplifier 4 compares the voltage with a reference voltage vr to output a difference signal to the holding circuit 7 having the reset function.

The holding circuit 7 having the reset function includes a peak detecting circuit consisting of a diode D8 and a capacitor C2, and a switching circuit SW1. The diode D8 and the capacitor C2 detect the peak of the output signal from the APC amplifier 4, and the capacitor C2 holds the detected value as a current control signal. The switching circuit SW1 is turned on in response to the reset signal to discharge the capacitor C2 through the resistor R7. Thus, the current control signal held in the capacitor C2 is reset.

The data interruption detecting circuit 6 includes the gate circuit G1, the constant current source CI4, the transistor Q9, and the capacitor C3. The capacitor C3 is charged by the constant current source CI4 through the transistor Q9, and is discharged through an impedance at the side of the switching circuit SW1 in the holding circuit 7. The impedance is an input resistance of the switching circuit SW1 when the switching circuit is in an off state. The switching circuit SW1 includes a resistor R7. The discharge time constant is formed by the resistance of the resistor R7 and the capacitance of the capacitor C3.

When the data DATA is "1", the inverted output signal of the gate circuit G2 is "0" so that the transistor Q9 is turned off. When the data DATA is "0", the output signal of the gate circuit G2 is "1" so that the transistor Q9 is turned on. At this time, the capacitor C3 is charged by the constant current source CI4. Accordingly, during the period when data DATA is input, the transistor Q9 is repeatedly turned on or off in response to the "0" or "1" value of the data DATA so that the capacitor C3 is repeatedly charged or discharged. The charging time constant and the discharging time constant are so set that the voltage across the capacitor C3 does not exceed a predetermined voltage at which the switching circuit SW1 is turned on.

When the data DATA, which is input in the burst mode, is in an interruption state, the value of the data is continuously "0" so that the transistor Q9 is continuously in the on state. As a result, the capacitor C3 is continuously charged by the constant current source CI4 so that the voltage across the terminals of the capacitor C3 exceeds the predetermined value, whereby a reset signal is input into the holding circuit 7 having the reset function. In response to the reset signal, the switching circuit SW1 is turned on to discharge the capacitor C2 through the resistor R7, thus performing the reset operation.

In the driving circuit 5, the output signal from the non-inverted output of the gate circuit G1 is input to the gate of the transistor Q1; the output signal from the inverted output of the gate circuit G1 is input to the gate of the transistor Q2; the constant current source CI1 is commonly connected to the sources of the transistors Q1 and Q2. Thus, the transistors Q1 and Q2, and the constant current source CI1 constitute a differential circuit. The transistors Q3 and Q4, the diodes D1 to D4, and the constant current sources CI2 and CI3 constitute a level converting circuit. The signals with the converted levels are respectively input to the gates of the transistors Q5 and Q6.

The current control signal is input to the gate of the transistor Q7, the drain of which is commonly connected to the sources of the transistors Q5 and Q6, whereby the current to be supplied to the semiconductor laser 1 is controlled through the transistor Q6. Since the transistor Q7 is a depletion type transistor as mentioned before, almost no current flows through the transistor Q7 when the holding circuit 7 is reset so that the current control signal becomes zero. Further, by setting the resistance of the resistor R5 to a certain value, a bias current can be supplied to the semiconductor laser 1 through the transistor Q8.

As mentioned before, the optical output of the semiconductor laser 1 is monitored by the photodiode 2, and the current flowing through the photodiode 2 is converted into a voltage by the current-to-voltage converting circuit 3. The voltage is input to the APC amplifier 4 in which the voltage is compared with the reference voltage Vr to obtain the differential output signal which is input to the holding circuit 7 having the reset function so that the voltage is held in the capacitor C2. The voltage held in the capacitor C2 is used as the current control signal input to the gate of the transistor Q7 in the driving circuit 5 so that the current flowing through the semiconductor laser 1 when the data DATA is "1" is controlled, thus obtaining a desired value of the optical output.

During an interrupt period of the data DATA input in the burst mode, the voltage across the terminals of the capacitor C3 in the data interruption detecting circuit 6 is increased so that the reset signal is input to the holding circuit 7 to reset the current control signal held in the holding circuit 7. Accordingly, when the interrupt period is relatively long, and the ambient temperature is lowered during that period, the current control signal is made zero at the initial time of the next input data DATA so that the current supplied to the semiconductor laser 1 is controlled to be minimum. Thus, the optical output can be prevented from being extremely increased. In order to maintain the optical output to be a predetermined value, the control loop through the APC amplifier 4 controls the driving current of the semiconductor laser 1 through the transistor Q7.

Figure 3:
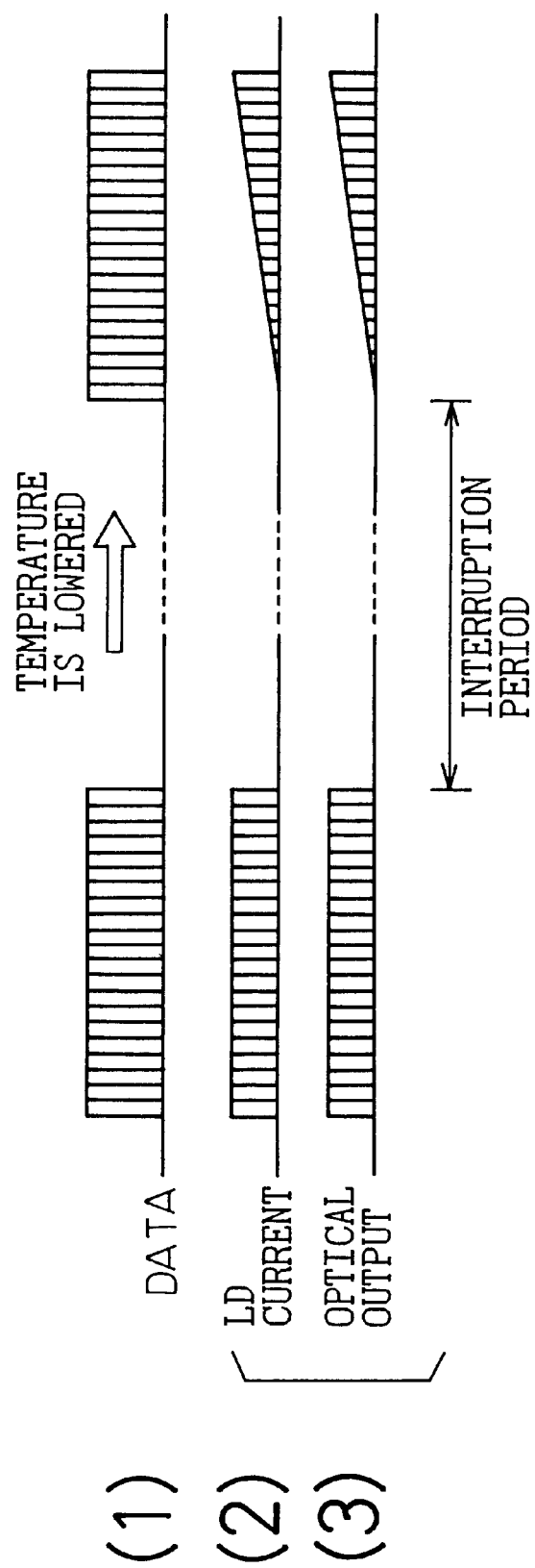
FIG. 3 is a diagram for explaining the operation of the circuit shown in FIG. 1 or FIG. 2.

FIG. 3 is a diagram for explaining the operation of the circuit shown in FIG. 1 or FIG. 2, wherein (1) shows the data DATA which is input in the burst mode; (2) shows the laser diode (LD) current supplied from the driving circuit 5 to the semiconductor laser 1; and (3) shows the optical output from the semiconductor laser 1.

Even when the interrupt period is so long that the ambient temperature is lowered, the current supplied to the semiconductor laser 1 is minimized because the holding circuit 7 having the reset function has been reset before receiving the data DATA after the interrupt period. The optical output is then controlled to be gradually increased to a predetermined value. According to the increase of the LD current, the optical output is also gradually increased. Thus, even when the ambient temperature is lowered during the interrupt period, the optical output of the semiconductor laser 1 can be prevented from becoming an excessive value at an initial period of the input data DATA.

Figure 4:
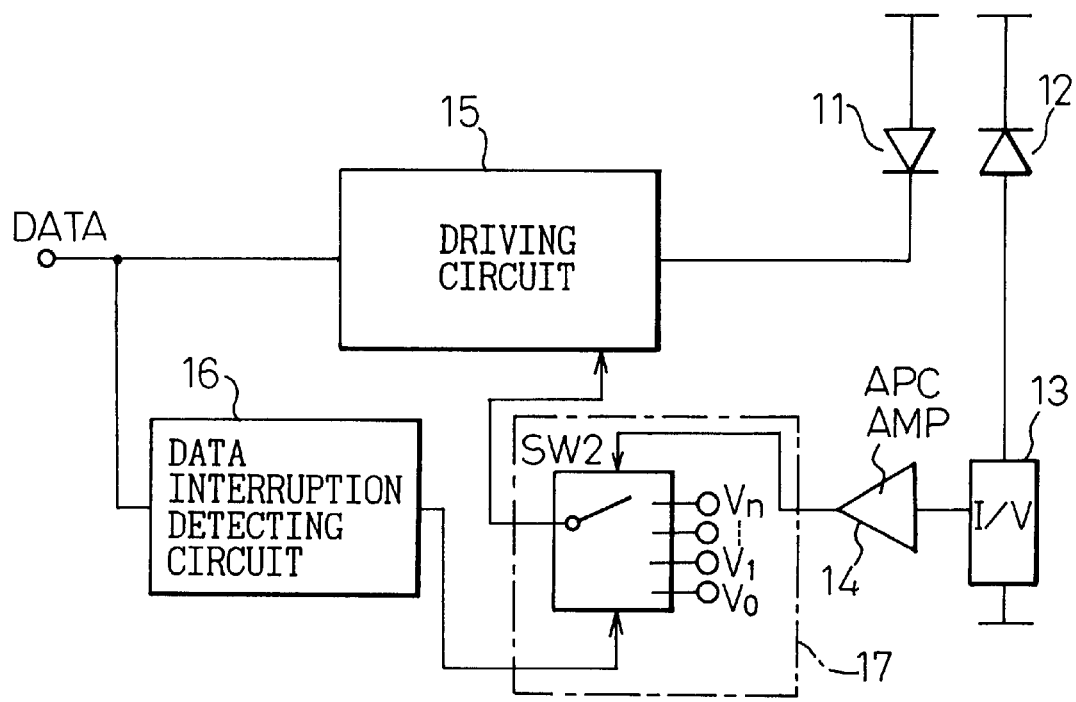
FIG. 4 is a block diagram of a burst light transmission circuit according to a second embodiment of the present invention.

FIG. 4 is a block diagram of a burst light transmission circuit according to a second embodiment of the present invention. In the figure, 11 is a semiconductor laser; 12 a photodiode; 13 a current-to-voltage converting circuit (I/V); 14 an APC amplifier; 15 a driving circuit; 16 a data interruption detecting circuit; 17 a holding circuit having a reset function; and SW2 a switching circuit.

The switching circuit SW2 in the holding circuit 17 has both the function of the peak detecting circuit and the function of the switching circuit SW1 in the holding circuit 7 in FIG. 2. In response to the output signal from the APC amplifier 14, the switching circuit SW2 selects one of voltages $V_0$ to $V_n$ as a current control signal.

For example, when the optical output of the semiconductor laser 11 is a predetermined value or below, a larger value among the voltages $V_0$ to $V_n$ is selected as the current control signal. Thereby the current supplied from the driving circuit 15 to the semiconductor laser 11 is made a large value so as to control the optical output to be a predetermined value. When the data interruption detecting circuit 16 detects an interruption state of the data DATA, the holding circuit 17 having the reset function also selects zero or the minimum value $V_0$ in response to the reset signal. Thus, the current control signal corresponding to the output signal from the APC amplifier 14 is reset.

Thereby, even when the ambient temperature is lowered during an interrupt period, the optical output of the semiconductor laser 11 can be prevented from becoming an excessive value at the initial time of the input of the data DATA. Instead of the minimum value $V_0$ such as zero, a value $V_1, V_2, \ldots$, which is larger than $V_0$, may be set as the initial set value to be selected by the switching circuit SW2 when the reset signal is input.

Figure 5:
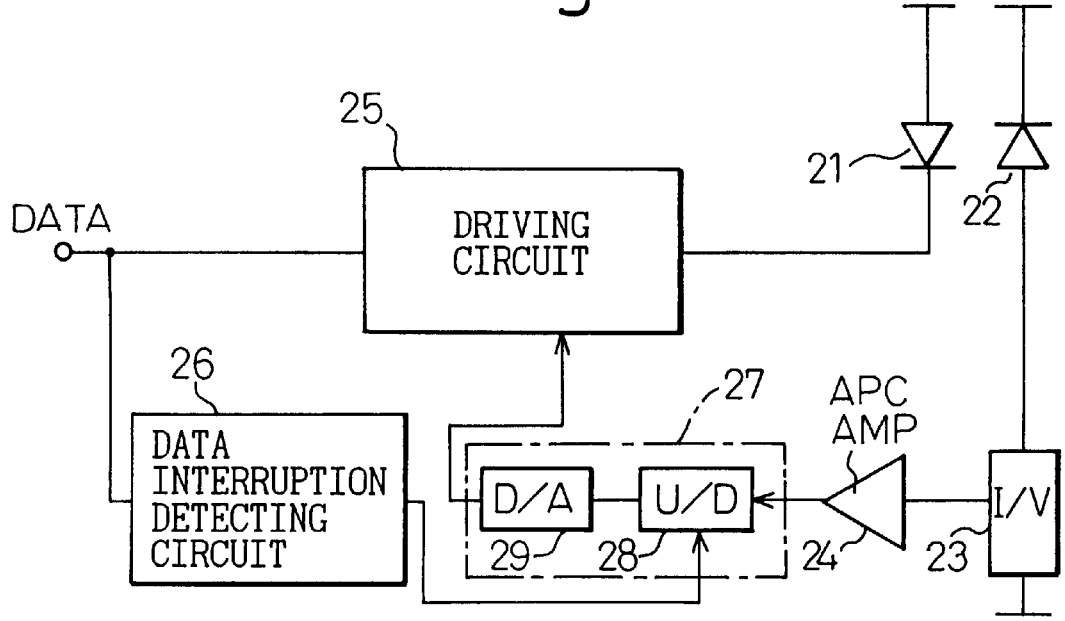
FIG. 5 is a block diagram of a burst light transmission circuit according to a third embodiment of the present invention.

FIG. 5 is a block diagram of a burst light transmission circuit according to a third embodiment of the present invention. In FIG. 5, reference numeral 21 denotes a semiconductor laser, 22 a photodiode, 23 a current-to-voltage converting circuit (IV), 24 an APC amplifier, 25 a driving circuit, 26 a data interruption detecting circuit, 27 a digital holding circuit, 28 an up/down counter (U/D), and 29 a D/A converter (D/A).

The digital holding circuit 27 includes the up/down counter 28 for counting up or counting down the output signal from the APC amplifier 24, and the D/A converter 29 for converting the counted value into the analog current control signal. For example, when the optical output exceeds a predetermined value, that is, when the level of the output signal of the APC amplifier 24 exceeds a predetermined level, the up/down counter 28 counts down; and when the optical output is lower than the predetermined value, that is, when the level of the output signal of the APC amplifier 24 is lower than the predetermined level, the up/down counter 28 counts up. The contents of the up/down counter 28 are converted into analog signal which is the current control signal. It will be seen that, while the holding circuit 7 having the reset function shown in FIG. 1 or FIG. 2 is an analog circuit, the holding circuit 27 is a digital circuit. In response to the reset signal from the data interruption detection circuit 26, the up/down counter 28 is reset to have an initial value of, for example, zero. That is, the digital holding circuit 27 has the same function as the before-mentioned holding circuit 7 or 17 having the reset function but is realized by a digital circuit. The contents held in the digital holding circuit 27 are reset by the reset signal from the data interruption detecting circuit 26. The other construction in the circuit shown in FIG. 5 is the same as that in the circuit shown in FIG. 1, FIG. 2 or FIG. 4.

Accordingly, an interrupt period of the data DATA which is input in the burst mode is detected by the data interruption detection circuit 26 to generate the reset signal. The up/down counter 28 in the digital holding circuit 27 is reset by the reset signal so that the current control signal to be input to the driving circuit 25 is controlled to make the current for driving the semiconductor laser 21 to be minimum. Whereby, even when the ambient temperature is lowered during the interrupt period, the optical output from the semiconductor laser 21 can be prevented from becoming an excessive value at the time of input of next data DATA.

Figure 6:
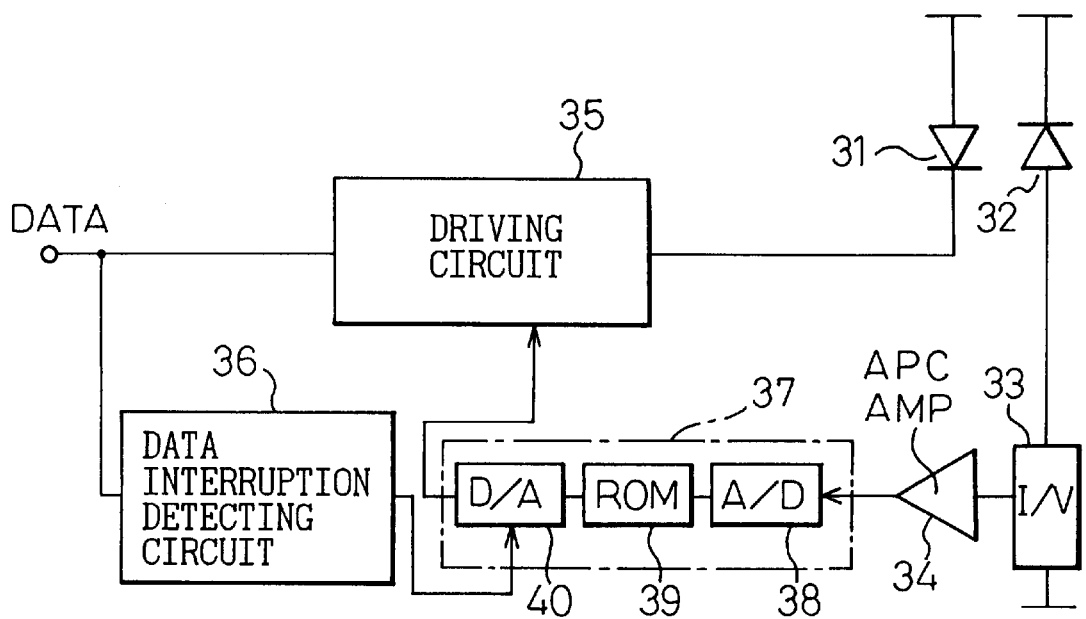
FIG. 6 is a block diagram of a burst light transmission circuit according to a fourth embodiment of the present invention.

FIG. 6 is a block diagram of a burst mode optical transmitter circuit according to a fourth embodiment of the present invention. In FIG. 6, a reference numeral 31 represents a semiconductor laser, 32 a photodiode, 33 a current-to-voltage converting circuit (I/V), 34 an APC amplifier; 35 a driving circuit; 36 a data interruption detecting circuit, 37 a digital holding circuit, 38 an A/D converter (A/D), 39 a memory (ROM), and 40 a D/A converter (D/A).

The digital holding circuit 37 includes the A/D converter 38, the memory 39, and the D/A converter 40. In response to the reset signal from the data interruption detecting circuit 36, the input value of the D/A converter 40, for example, is reset to make the current control signal to be zero. The memory 39 is constructed by a read only memory, an EEPROM, or the like which stores data corresponding to the current control signal at addresses which are digital values corresponding to the output signal from the APC amplifier 34.

The memory 39 can be so constructed that, when the level of the output signal of the APC amplifier 34 is larger than a predetermined value, that is, when the optical output is larger than a predetermined value, a smaller value is read from the memory 39, and when the level of the output signal of the APC amplifier 34 is smaller than the predetermined level, that is, when the optical output is smaller than the predetermined value, a larger value is read from the memory 39. The other parts such as the driving circuit, the data interruption detecting circuit 36, or the like is the same as those in FIG. 1, FIG. 2, FIG. 4 and FIG. 5.

In this embodiment also, an interrupt period of the data DATA which is input in the burst mode is detected by the data interruption detection circuit 36 to generate the reset signal. The digital holding circuit 37 is reset by the reset signal so that the current value to be supplied from the driving circuit 35 to the semiconductor laser 31 is suppressed, whereby, even when the ambient temperature is lowered during the interrupt period, the optical output from the semiconductor laser 31 cap be prevented from becoming an excessive value.

Figure 7:
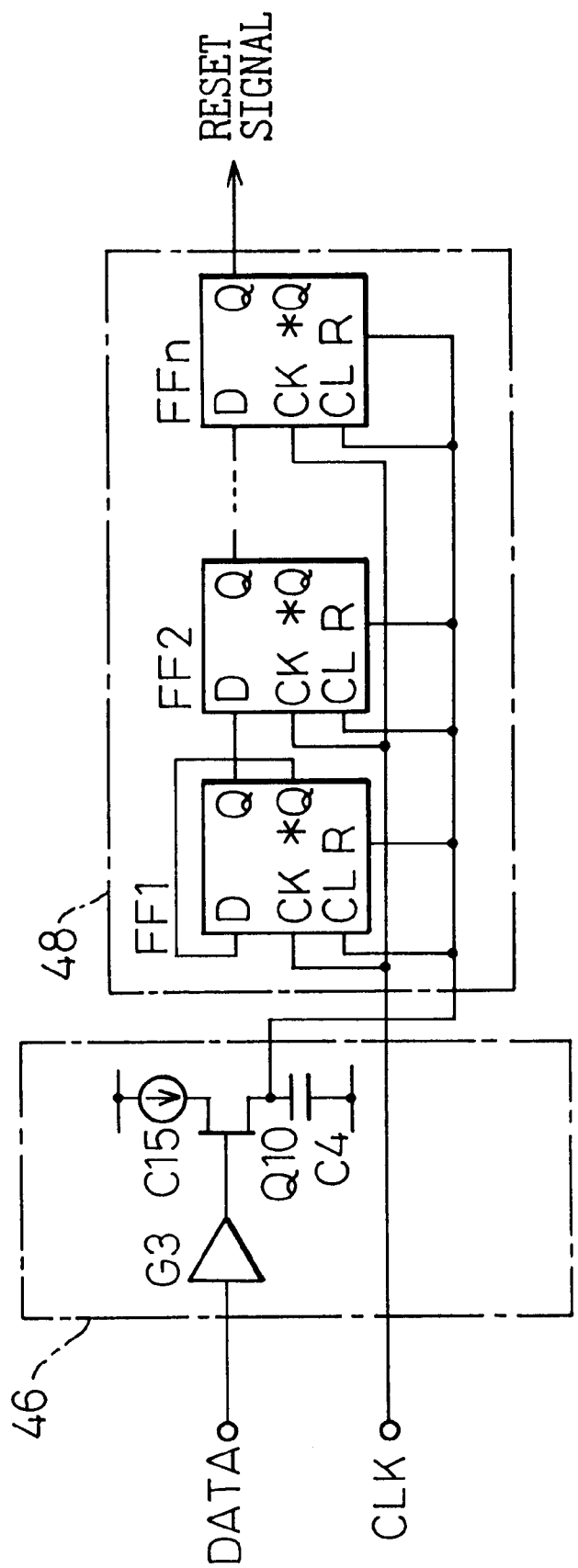
FIG. 7 is a block diagram of a burst light transmission circuit according to a fifth embodiment of the resent invention.

FIG. 7 is a block diagram of a data interruption detecting circuit 46 and a timer 48 according to a fifth embodiment of the present invention. In FIG. 7, reference character G3 denotes a gate circuit, Q10 a transistor, CI5 a constant current source, C4 a capacitor, FF1 to FFn flip flops, DATA data, and CLK a clock signal. D in each of the flip flops FF1 to FFn denotes a data terminal, Q an output terminal, *Q an inverted output terminal, CK a clock terminal, CL a clear terminal, and R a reset terminal. When a high level signal ("1") is input into the clear terminal CL and the reset terminal R, the flip flop is reset.

In the data interruption detecting circuit 46, when the data DATA is "1", the transistor Q10 is turned ON so that the capacitor C4 is charged by the constant current source CI5. The voltage across the terminals of the capacitor C4 is input to the timer 48. When the data in the burst mode is input to the data interruption detecting circuit 46, the transistor Q10 in the data interruption detecting circuit 48 is turned ON so that the capacitor C4 is charged. When the voltage across the terminals of the capacitor C4 exceeds a predetermined value, i.e., when the voltage across the terminals of the capacitor C4 is at the high level, all of the flip flops FF1 to FFn in the timer 48 are reset. As a result, the reset signal from the output terminal Q of the final-stage flip flop FFn becomes "0".

During the interrupt period of the data DATA, the transistor Q10 in the data interruption detecting circuit 46 is in an OFF state so that the capacitor C4 discharges through a not-shown discharging circuit or through the flip flops FF1 to FFn. As a result, the voltage across the terminals of the capacitor C4 is made a value (low level) lower than the predetermined value which is input to the clear terminals CL of the flip flops FF1 to FFn to reset them. In these states, in response to a first clock signal CLK, the flip flop FF1 is reset to output "1" at its output terminal Q. In response to sequential clock signals CLK, the data at the output terminals Q of the flip flops FF2 to FFn are sequentially set to "1". When the reset signal of "1" is output from the final stage flip flop FFn, the reset signal is input to a not shown holding circuit having a reset function or a digital holding circuit to reset the current control signal for the driving circuit to zero or a predetermined value.

The data interruption detecting circuit 46 detects, in an analog mode, the start of the interrupt period of the data DATA. Therefore, the detected start times may vary. However, by providing the timer 48, the time between the start of the interrupt period of the data DATA and the time of sending out of the reset signal can be accurately set with the accuracy of the clock signal CLK.

The set time of the timer 48 can be easily determined by the number of flip flops FF1 to FFn connected in cascade. The timer 48 functions to delay the signal detected by the data interruption detecting circuit 46 for a predetermined time period. For delaying the signal, another circuit construction may alternatively be employed. When the interrupt period of the data DATA in the burst mode is short so that the change of the temperature can be neglected, the holding circuit having the reset function or the digital holding circuit may not be reset. In such a case, the set time of the timer 48 may be set to an arbitrary value so that the reset signal is not output.

Figure 8:
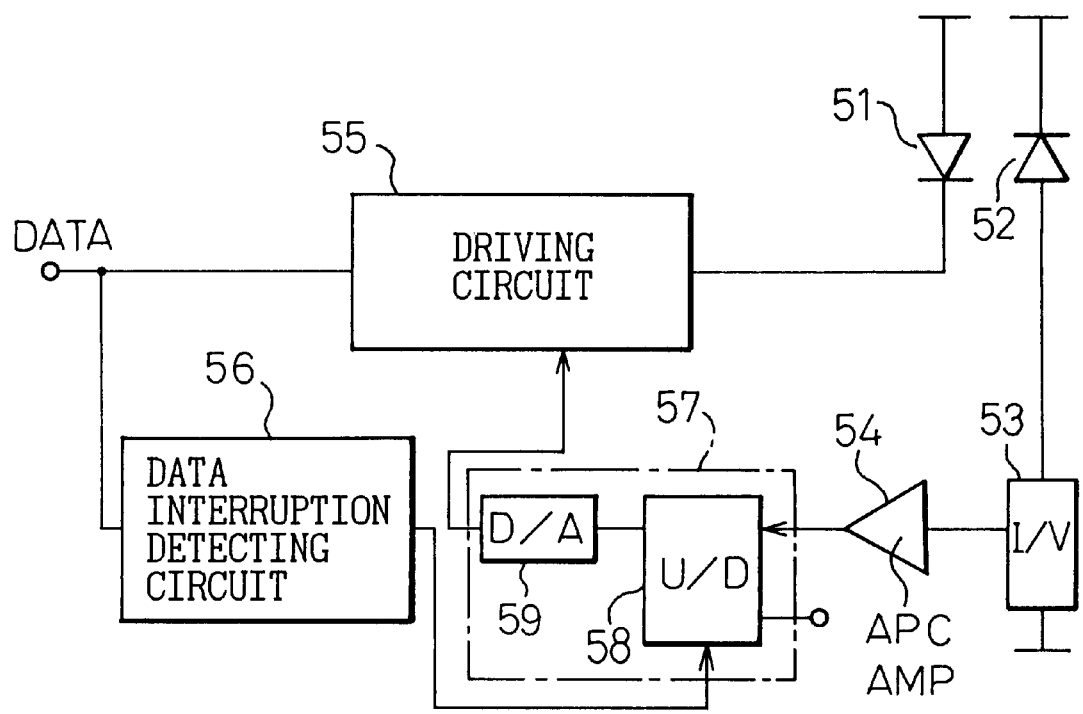
FIG. 8 is a block diagram of a burst light transmission circuit according to a sixth embodiment of the present invention.

FIG. 8 is a block diagram of a burst mode optical transmitter circuit according to a sixth embodiment of the present invention. In FIG. 8, reference character 51 represents a semiconductor laser, 52 a photodiode, 53 a current-to-voltage converting circuit (I/V), 54 an APC amplifier, 55 a driving circuit, 56 a data interruption detecting circuit, 57 a digital holding circuit, 58 an up/down counter (U/D), and 59 a D/A converter (D/A).

In this embodiment, a reset signal is generated at the time of the interruption state of the data DATA in the burst mode. The reset signal from the data interruption detecting circuit 56 is applied as an initial loading signal to the up/down counter 58 in the digital holding circuit 57. In response to the initial loading signal, the up/down counter 58 loads an initial value.

Figure 9:
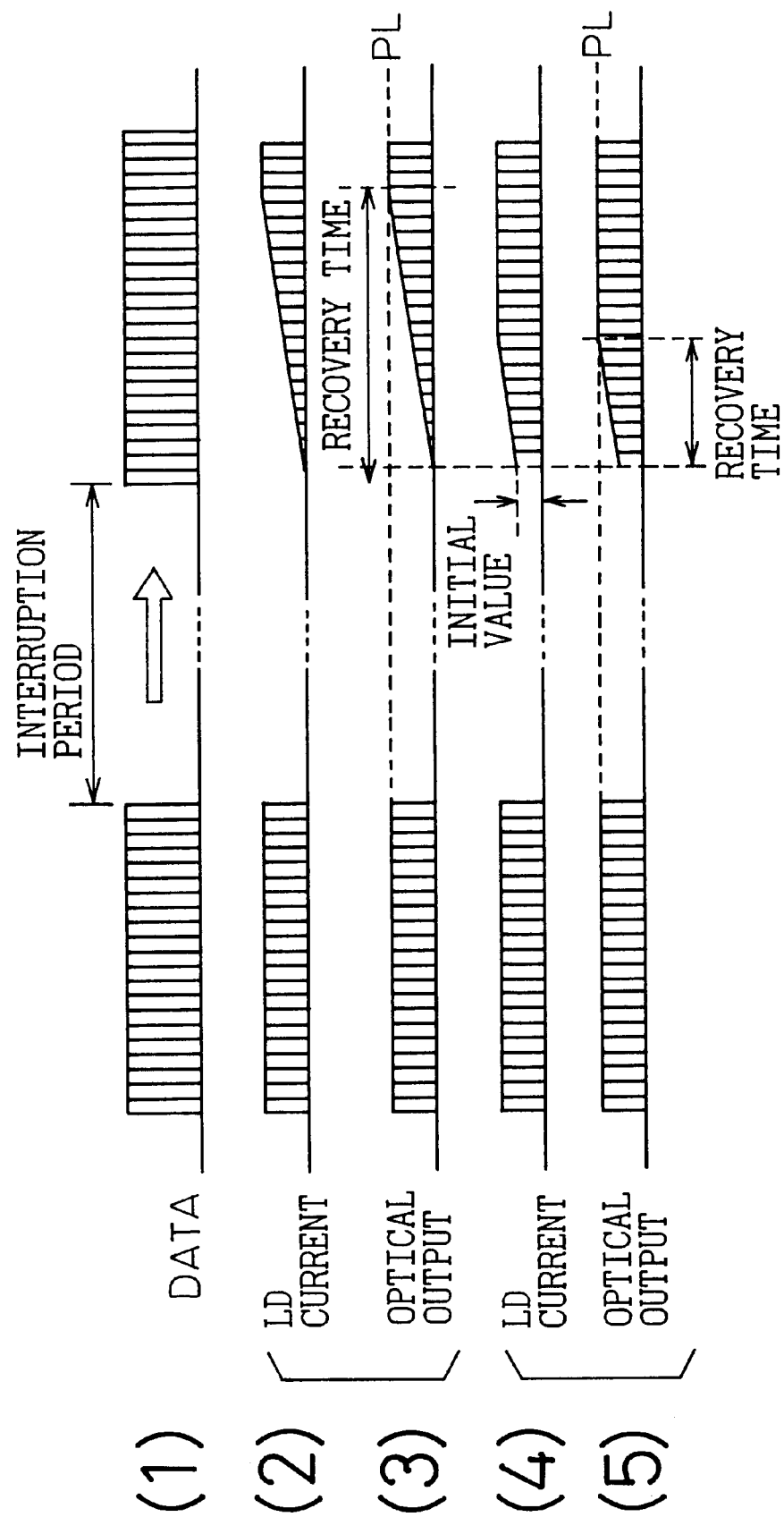
FIG. 9 is a diagram for explaining the operation of the circuit shown in FIG. 8.

FIG. 9 is a diagram for explaining the operation of the circuit shown in FIG. 8, in which (1) shows the data DATA in the burst mode; (2) shows the LD current which is reset to zero in the interrupt period; (3) shows the optical output when the LD current is reset to zero during the interrupt period; (4) shows the LD current which is reset to an initial value at the beginning of the burst period; and (5) shows the optical output when the LD current is reset to the initial value as shown in (4).

As will be apparent from (2) and (3) in FIG. 9, when the current control signal is reset to zero during the interrupt period, the current to be supplied to the semiconductor laser, i.e., the LD current, has to be increased from the minimum value or zero, resulting in a long recovery time for the optical output to reach a predetermined level PL, whereas, when the current control signal is reset to an initial set value larger than zero at the beginning of the burst period, the current to be supplied to the semiconductor laser, i.e., the LD current, increases from the initial value so that it takes a short recovery time for the optical output to reach the predetermined level PL.

With respect to the loading of this initial value, if the switch SW2 in the embodiment shown in FIG. 4 is so constructed as to select a current control signal having a certain value in response to the reset signal, the same effects as those in the circuit shown in FIG. 8 can be obtained. Similarly, if the A/D converter 38 in the embodiment shown in FIG. 6 is constructed to output an address of the memory 39 from which the initial value is read out, the same effects as those in the circuit shown in FIG. 8 can be obtained.

Figure 10:
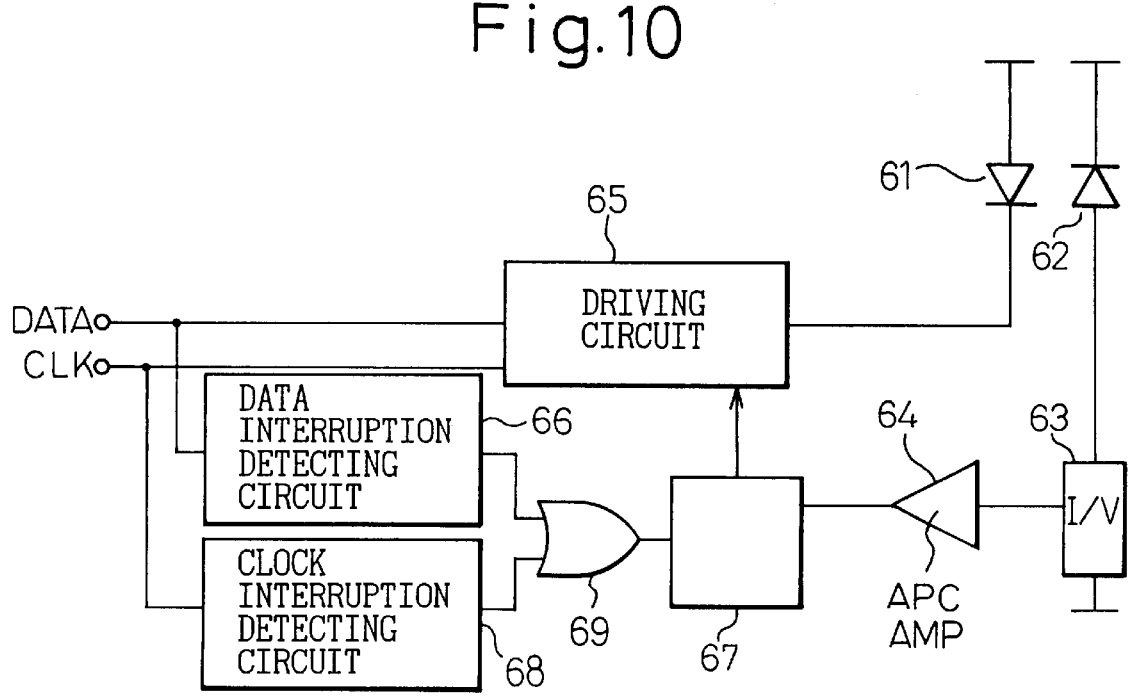
FIG. 10 is a block diagram of a burst light transmission circuit according to a seventh embodiment of the present invention.

FIG. 10 is a block diagram of a burst light transmission circuit according to a seventh embodiment of the present invention. In the figure, 61 represents a semiconductor laser, 62 a photodiode, 63 a current-to-voltage converting circuit, 64 an APC amplifier; 65 a driving circuit, 66 a data interruption detecting circuit, 67 a holding circuit 68 a clock interruption detecting circuit, and 69 an OR circuit.

Similar to the above-described embodiments, the data interruption detecting circuit 66 detects an interrupt period of the data DATA in the burst mode, and the holding circuit 67 resets the current control signal through the OR gate 69. According to this embodiment, it has been noted that the driving circuit 65 cannot be normally operated if the clock signal CLK is interrupted. Thus, when an interruption of the clock signal CLK is detected by the clock interruption detecting circuit 68, a reset signal is input to the holding circuit 67 so that the driving current to be supplied from the driving circuit 65 to the semiconductor laser 61 is controlled to be minimized whereby, when either of the interruption of the data DATA or the interruption of the clock CLK is detected, the current control signal to be input to the driving circuit 65 is reset, so that an excessive increase of the optical output at the time when the next data DATA is input or when the interruption of the clock signal is recovered can be prevented even when the temperature is lowered during the interrupt period.

Figure 11:
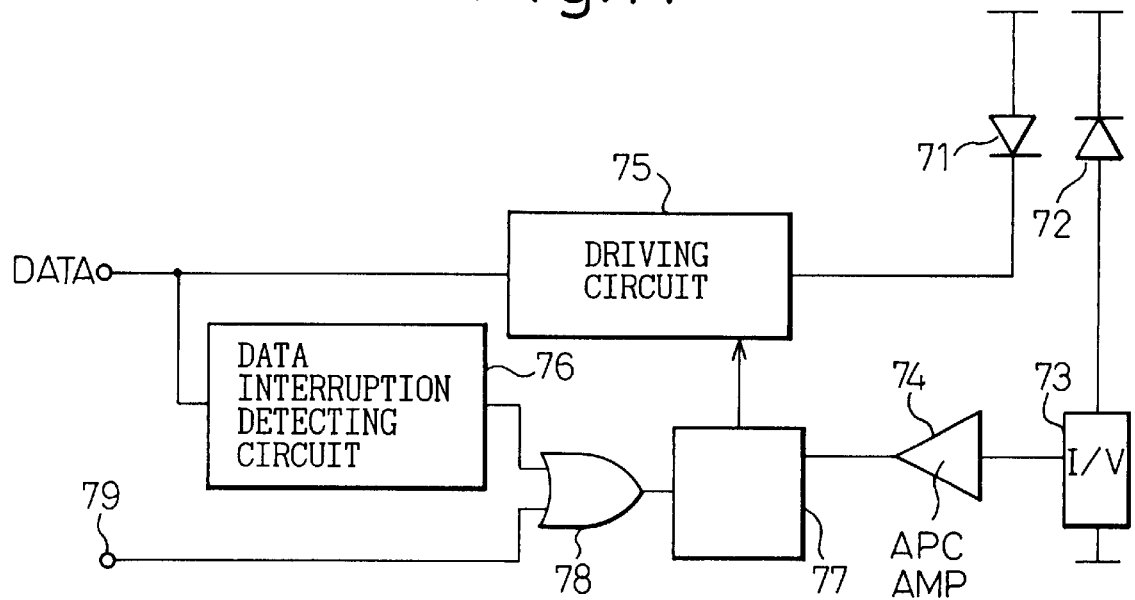
FIG. 11 is a block diagram of a burst light transmission circuit according to an eighth embodiment of the present invention.

FIG. 11 is a block diagram of a burst light transmission circuit according to an eighth embodiment of the present invention. In FIG. 11, a reference numeral 71 denotes a semiconductor laser, 72 a photodiode, 73 a current-voltage converting circuit (I/V), 74 an APC amplifier, 75 a driving circuit, 76 a data interruption detection circuit, 77 a holding circuit, 78 an OR circuit, and 79 an external terminal.

The construction and the operation of this embodiment are almost the same as those of the embodiment shown in FIG. 10. The only difference is that, in this embodiment, the reset signal can be input from the external terminal 79 to the holding circuit 77. When various types of tests are to be effected, the reset signal can be input from an upper apparatus or by manual operation. For example, the holding circuit 77 is reset to an initial state, and then the APC amplifier 74 is operated to test its response characteristic or the like.

Figure 12:
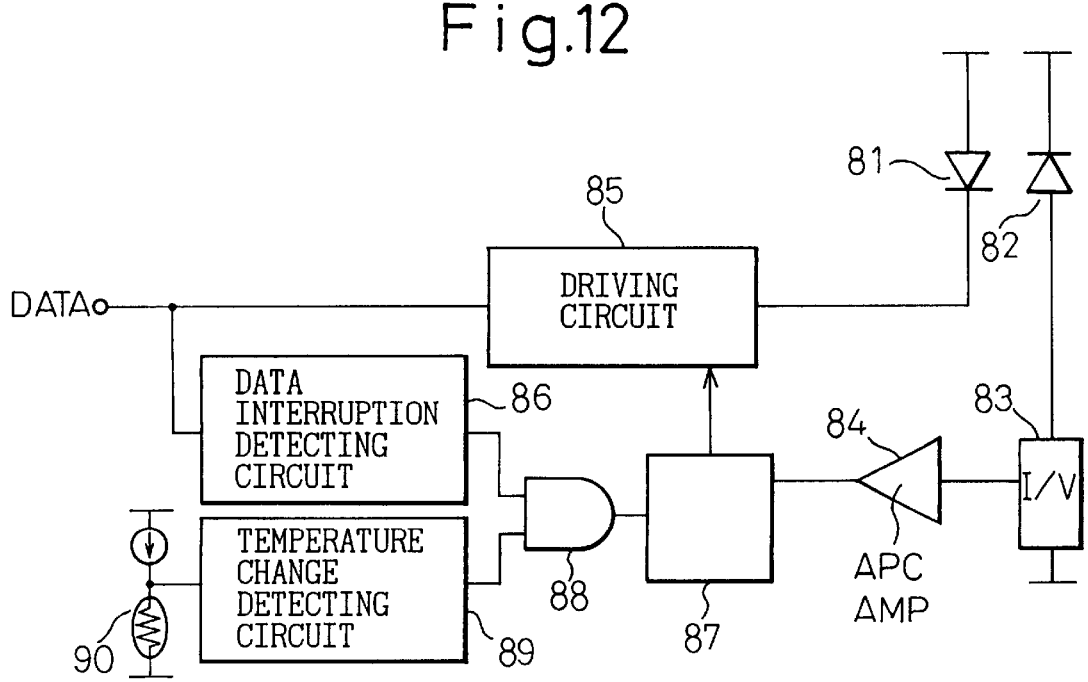
FIG. 12 is a block diagram of a burst light transmission circuit according to a ninth embodiment of the present invention.

FIG. 12 is a block diagram of a burst light transmission circuit according to a ninth embodiment of the present invention. In FIG. 12, 81 is a semiconductor laser, 82 a photodiode, 83 a current-to-voltage converting circuit (I/V), 84 an APC amplifier, 85 a driving circuit, 86 a data interruption detecting circuit, 87 a holding circuit, 88 an AND circuit, 89 a temperature change detecting circuit, and 90 a temperature sensor.

In this embodiment, an interruption of data DATA which is input in the burst mode is detected by the data interruption detecting circuit 86. The detected signal of "1" is input to the AND circuit 88. On the other hand, the temperature change detecting circuit 89 detects whether or not the temperature detected by the temperature sensor such as a thermistor or the like is changed. When the temperature is changed by a predetermined value or more, a temperature change detecting signal of "1" is input to the AND circuit 88. When both inputs of the AND circuit 88 receive the signal "1", the AND circuit 88 outputs "1" which is input as a reset signal to the holding circuit 89 so that the current control signal to be input to the driving circuit 85 is reset. Thus, only when the temperature is changed for a predetermined amount or more during the interrupt period of the data DATA, is the holding circuit 78 reset.

Figure 13:
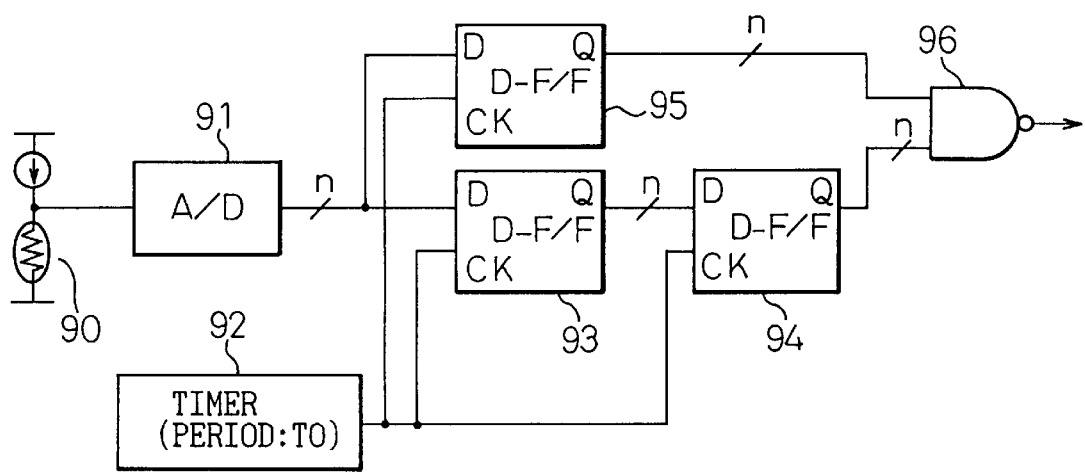
FIG. 13 is a block diagram of a temperature change detecting circuit in the circuit shown in FIG. 12.

FIG. 13 is a block diagram of a temperature change detecting circuit in the circuit shown in FIG. 12. In FIG. 13, a reference numeral 90 denotes a temperature sensor, 91 an A/D converter (A/D), 92 a timer, 93–95 D-type flip flops, and 96 a NAND circuit.

Figure 14:
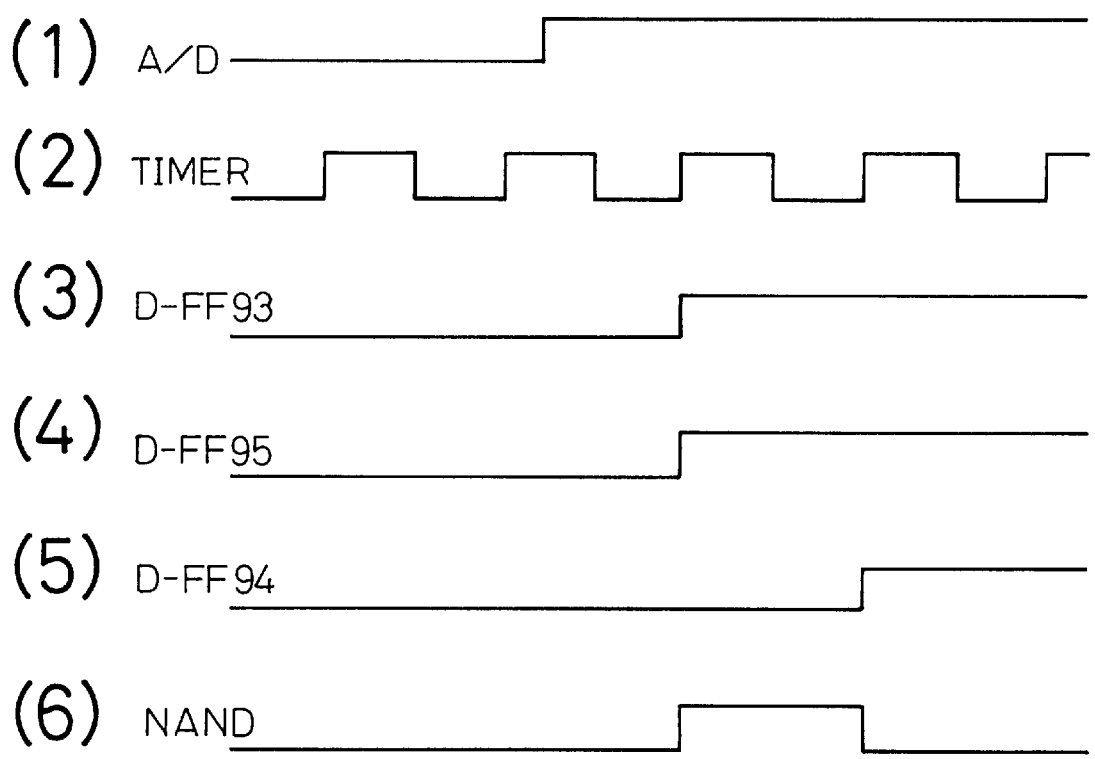
FIG. 14 is a diagram for explaining the operation of the circuit shown in FIG. 13.
Figure 15:
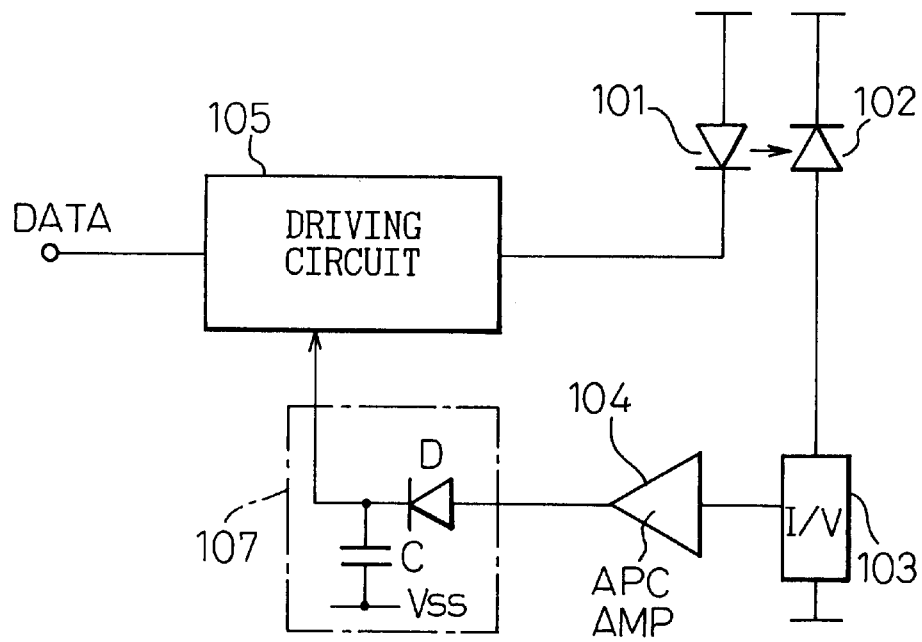
FIG. 15 is a block diagram of a prior art burst light transmission circuit.
Figure 16:
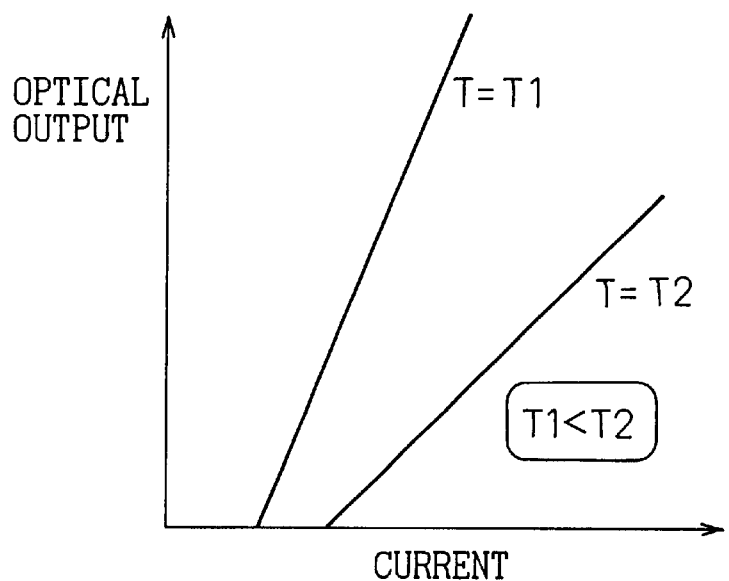
FIG. 16 is a graph showing driving current-optical output characteristic of a semiconductor laser.
Figure 17:
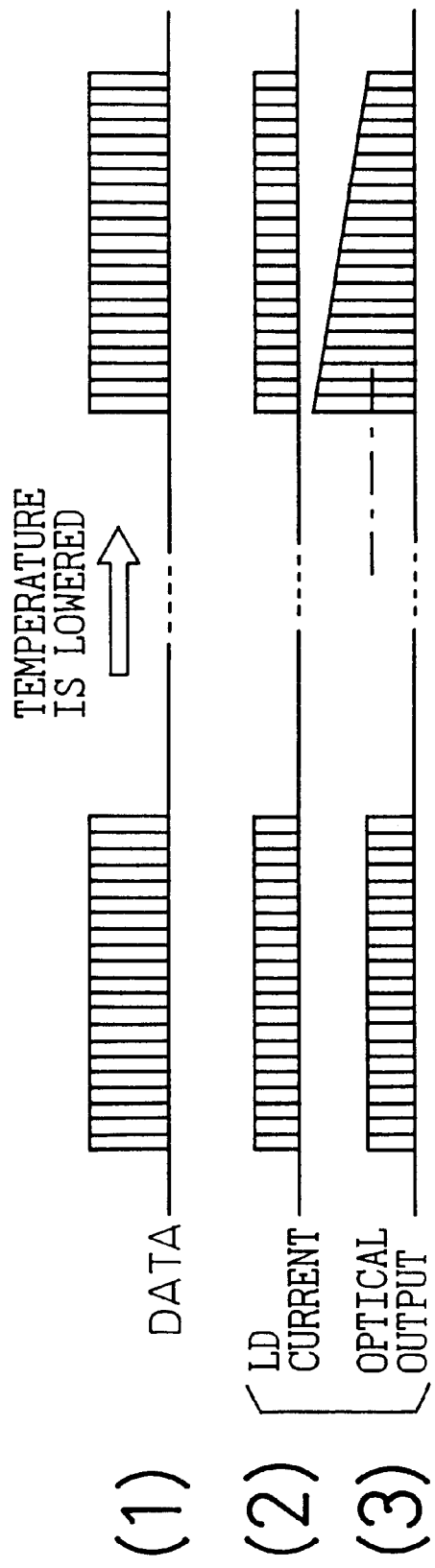
FIG. 17 is a diagram for explaining the operation of the prior art circuit shown in FIG. 15.

FIG. 14 is a time chart for explaining the operation of the circuit shown in FIG. 13.

The timer 92 generates an output signal having a period T0 as shown in (2) of FIG. 14. The output signal is input to the clock terminals CK of the D-type flip flops 93, 94 and 95. A constant current source is connected to the temperature sensor 90. The voltage across both terminals of the temperature sensor 90 is a temperature detecting signal. The temperature detecting signal is converted into a digital signal by the A/D converter 91. The A/D converter 91 converts the output signal from the temperature sensor 90 into a digital signal. When the ambient temperature is lowered to a level lower than a predetermined level, the output of the D/A converter 91 is changed from "0" to "1" for example, as shown in (1) of FIG. 14. The digital signal is input to data terminals D of the D-type flip flops 93 and 94.

The digital signal from the A/D converter 91 at every period T0 is held in the D-type flip flops 93 and 95 as shown in (3) and (4) of FIG. 14. The output of the D-type flip flop 93 is delayed by one period T0 through the D-type flip flop 94 as shown in (4) of FIG. 14. The NAND circuit 96 compares the digital signals held in the D-type flip flop 94 and 95. When the ambient temperature is not changed, the outputs of the D-type flip flops 93, 94 and 95 are kept to "0" so that the output signal of the NAND circuit 96 is "0". When the ambient temperature is changed to be lower than a predetermined value at a certain time, the output signals of the D-type flip flops 93 and 95 are set to "1" in response to the next rising edge of the output of the timer 92, as shown in (3) and (4) of FIG. 14, and then the output of the D-type flip flop 94 is set to "1" after a delay of one period T0 as shown in (5) of FIG. 14. The NAND circuit 96 compares the outputs of the D-type flip flops 94 and 95 and generates a temperature change detecting signal of "1" of one period T0 as shown in (6) of FIG. 14 when the output of the D-type flip flop 95 is "1" and the output of the D-type flip flop 94 is "0".

Accordingly, even when the interrupt period of the data DATA is long, the holding circuit 87 is not reset if the temperature is not changed during that period. Thus, the recovery time shown in FIG. 9 for example can be made to be close to zero.

The present invention is not limited to the above-described embodiments. Various combinations of the embodiments or addition or modification of the construction may be possible. Also, the data interruption detecting circuit may be constructed by a digital circuit to detect an interruption of data DATA in the burst mode. Further, in the illustrated embodiments, the driving circuit for supplying a driving current to the semiconductor laser is constructed by FETS, however, the driving circuit may be constructed by bipolar transistors.

As described above, according to the present invention, an interruption of data DATA which is input in a burst mode is detected by the data interruption detecting circuit to reset a current control signal held in the holding circuit, whereby, even when the interrupt period is long so that the ambient temperature is lowered, there is an advantage in that an excessive optical output can be automatically and surely prevented since the optical output of the semiconductor laser in response to the next data DATA increases from the initial state. In addition, since the construction of the data interruption detecting circuit or the holding circuit is simple, the optical transmission apparatus can be made with an improved reliability without increasing the cost. Still further, according to another embodiment of the present invention, since the current control signal is not reset to zero by a reset signal, but is reset to a predetermined initial value, the recovery time can be shortened.

What is claimed is:

1. A burst mode optical transmitter circuit comprising:
    a semiconductor laser for converting data input in a burst mode into an optical signal;
    a photodiode for monitoring the light output from said semiconductor laser;
    a current-voltage converting circuit for converting the current detected by said photodiode into a voltage;
    an APC amplifier for comparing the output signal from said current-voltage converting circuit with a reference value;
    a holding circuit for holding, as a current control signal, the output signal from said APC amplifier, and having a reset function to reset the held current control signal;
    a driving circuit for controlling, according to said current control signal held in said holding circuit and said data, the current to be supplied to said semiconductor laser; and a data interruption detecting circuit for detecting an interrupt period of said data input to said driving circuit to reset said holding circuit.

2. The burst mode optical transmitter circuit according to claim 1, wherein said holding circuit comprises a peak detecting circuit for detecting a peak value of the output signal from said APC amplifier, and a switching circuit for resetting said peak detecting circuit by the reset signal from said data interruption detecting circuit.

3. The burst mode optical transmitter circuit according to claim 1, wherein said holding circuit comprises a switching circuit for switching and holding said current control signal in response to the output signal from said APC amplifier and for switching and setting said current control signal to a reset value in response to a reset signal from said data interruption detecting circuit.

4. The burst mode optical transmitter circuit according to claim 1, wherein said holding circuit is a digital circuit for converting the output signal from said APC amplifier into a digital signal, for holding said digital signal, and for resetting said held digital signal in response to a reset signal from said data interruption detecting circuit.

5. The burst mode optical transmitter circuit according to claim 1, wherein said holding circuit comprises a construction for holding a current control signal corresponding to the output signal from said APC amplifier, and for resetting said current control signal to an initial set value in response to a reset signal from said data interruption detecting circuit.

6. The burst mode optical transmitter circuit according to claim 2, wherein said holding circuit comprises a construction for holding a current control signal corresponding to the output signal from said APC amplifier, and for resetting said current control signal to an initial set value in response to a reset signal from said data interruption detecting circuit.

7. The burst mode optical transmitter circuit according to claim 3, wherein said holding circuit comprises a construction for holding a current control signal corresponding to the output signal from said APC amplifier, and for resetting said current control signal to an initial set value in response to a reset signal from said data interruption detecting circuit.

8. The burst mode optical transmitter circuit according to claim 4, wherein said holding circuit comprises a construction for holding a current control signal corresponding to the output signal from said APC amplifier, and for resetting said current control signal to an initial set value in response to a reset signal from said data interruption detecting circuit.

9. The burst mode optical transmitter circuit according to claim 1, further comprising a timer activated by a reset signal from said data interruption detecting circuit to input said reset signal into said holding circuit after a predetermined time.

10. The burst mode optical transmitter circuit according to claim 2, further comprising a timer activated by a reset signal from said data interruption detecting circuit to input said reset signal into said holding circuit after a predetermined time.

11. The burst mode optical transmitter circuit according to claim 3, further comprising a timer activated by a reset signal from said data interruption detecting circuit to input said reset signal into said holding circuit after a predetermined time.

12. The burst mode optical transmitter circuit according to claim 4, further comprising a timer activated by a reset signal from said data interruption detecting circuit to input said reset signal into said holding circuit after a predetermined time.

13. The burst mode optical transmitter circuit according to claim 5, further comprising a timer activated by a reset signal from said data interruption detecting circuit to input said reset signal into said holding circuit after a predetermined time.

14. The burst mode optical transmitter circuit according to claim 6, further comprising a timer activated by a reset signal from said data interruption detecting circuit to input said reset signal into said holding circuit after a predetermined time.

15. The burst mode optical transmitter circuit according to claim 7, further comprising a timer activated by a reset signal from said data interruption detecting circuit to input said reset signal into said holding circuit after a predetermined time.

16. The burst mode optical transmitter circuit according to claim 8, further comprising a timer activated by a reset signal from said data interruption detecting circuit to input said reset signal into said holding circuit after a predetermined time.

17. The burst mode optical transmitter circuit according to claim 1, further comprising a clock interruption detecting circuit for detecting an interruption of a clock signal input to said driving circuit, and an OR circuit for providing a reset signal to be supplied to said holding circuit when at least one of a reset signal from said data interruption detecting circuit and a clock interruption detection signal from said clock interruption detecting circuit is input to said OR circuit.

18. The burst mode optical transmitter circuit according to claim 2, further comprising a clock interruption detecting circuit for detecting an interruption of a clock signal input to said driving circuit, and an OR circuit for providing a reset signal to be supplied to said holding circuit when at least one of a reset signal from said data interruption detecting circuit and a clock interruption detection signal from said clock interruption detecting circuit is input to said OR circuit.

19. The burst mode optical transmitter circuit according to claim 3, further comprising a clock interruption detecting circuit for detecting an interruption of a clock signal input to said driving circuit, and an OR circuit for providing a reset signal to be supplied to said holding circuit when at least one of a reset signal from said data interruption detecting circuit and a clock interruption detection signal from said clock interruption detecting circuit is input to said OR circuit.

20. The burst mode optical transmitter circuit according to claim 4, further comprising a clock interruption detecting circuit for detecting an interruption of a clock signal input to said driving circuit, and an OR circuit for providing a reset signal to be supplied to said holding circuit when at least one of a reset signal from said data interruption detecting circuit and a clock interruption detection signal from said clock interruption detecting circuit is input to said OR circuit.

21. The burst mode optical transmitter circuit according to claim 5, further comprising a clock interruption detecting circuit for detecting an interruption of a clock signal input to said driving circuit, and an OR circuit for providing a reset signal to be supplied to said holding circuit when at least one of a reset signal from said data interruption detecting circuit and a clock interruption detection signal from said clock interruption detecting circuit is input to said OR circuit.

22. The burst mode optical transmitter circuit according to claim 6, further comprising a clock interruption detecting circuit for detecting an interruption of a clock signal input to said driving circuit, and an OR circuit for providing a reset signal to be supplied to said holding circuit when at least one of a reset signal from said data interruption detecting circuit and a clock interruption detection signal from said clock interruption detecting circuit is input to said OR circuit.

23. The burst mode optical transmitter circuit according to claim 7, further comprising a clock interruption detecting circuit for detecting an interruption of a clock signal input to said driving circuit, and an OR circuit for providing a reset signal to be supplied to said holding circuit when at least one of a reset signal from said data interruption detecting circuit and a clock interruption detection signal from said clock interruption detecting circuit is input to said OR circuit.

24. The burst mode optical transmitter circuit according to claim 8, further comprising a clock interruption detecting circuit for detecting an interruption of a clock signal input to said driving circuit, and an OR circuit for providing a reset signal to be supplied to said holding circuit when at least one of a reset signal from said data interruption detecting circuit and a clock interruption detection signal from said clock interruption detecting circuit is input to said OR circuit.

25. The burst mode optical transmitter circuit according to claim 9, further comprising a clock interruption detecting circuit for detecting an interruption of a clock signal input to said driving circuit, and an OR circuit for providing a reset signal to be supplied to said holding circuit when at least one of a reset signal from said data interruption detecting circuit and a clock interruption detection signal from said clock interruption detecting circuit is input to said OR circuit.

26. The burst mode optical transmitter circuit according to claim 10, further comprising a clock interruption detecting circuit for detecting an interruption of a clock signal input to said driving circuit, and an OR circuit for providing a reset signal to be supplied to said holding circuit when at least one of a reset signal from said data interruption detecting circuit and a clock interruption detection signal from said clock interruption detecting circuit is input to said OR circuit.

27. The burst mode optical transmitter circuit according to claim 11, further comprising a clock interruption detecting circuit for detecting an interruption of a clock signal input to said driving circuit, and an OR circuit for providing a reset signal to be supplied to said holding circuit when at least one of a reset signal from said data interruption detecting circuit and a clock interruption detection signal from said clock interruption detecting circuit is input to said OR circuit.

28. The burst mode optical transmitter circuit according to claim 12, further comprising a clock interruption detecting circuit for detecting an interruption of a clock signal input to said driving circuit, and an OR circuit for providing a reset signal to be supplied to said holding circuit when at least one of a reset signal from said data interruption detecting circuit and a clock interruption detection signal from said clock interruption detecting circuit is input to said OR circuit.

29. The burst mode optical transmitter circuit according to claim 13, further comprising a clock interruption detecting circuit for detecting an interruption of a clock signal input to said driving circuit, and an OR circuit for providing a reset signal to be supplied to said holding circuit when at least one of a reset signal from said data interruption detecting circuit and a clock interruption detection signal from said clock interruption detecting circuit is input to said OR circuit.

30. The burst mode optical transmitter circuit according to claim 14, further comprising a clock interruption detecting circuit for detecting an interruption of a clock signal input to said driving circuit, and an OR circuit for providing a reset signal to be supplied to said holding circuit when at least one of a reset signal from said data interruption detecting circuit and a clock interruption detection signal from said clock interruption detecting circuit is input to said OR circuit.

31. The burst mode optical transmitter circuit according to claim 15, further comprising a clock interruption detecting circuit for detecting an interruption of a clock signal input to said driving circuit, and an OR circuit for providing a reset signal to be supplied to said holding circuit when at least one of a reset signal from said data interruption detecting circuit and a clock interruption detection signal from said clock interruption detecting circuit is input to said OR circuit.

32. The burst mode optical transmitter circuit according to claim 16, further comprising a clock interruption detecting circuit for detecting an interruption of a clock signal input to said driving circuit, and an OR circuit for providing a reset signal to be supplied to said holding circuit when at least one of a reset signal from said data interruption detecting circuit and a clock interruption detection signal from said clock interruption detecting circuit is input to said OR circuit.

33. The burst mode optical transmitter circuit according to claim 1, further comprising a temperature change detecting circuit for detecting whether or not a temperature around said semiconductor laser has been changed within a predetermined period, and an AND circuit for providing a reset signal to said holding circuit only when both of said reset signal from said data interruption detecting circuit and the temperature change detection signal from said temperature change detecting circuit are input to said AND circuit.

34. The burst mode optical transmitter circuit according to claim 2, further comprising a temperature change detecting circuit for detecting whether or not a temperature around said semiconductor laser has been changed within a predetermined period, and an AND circuit for providing a reset signal to said holding circuit only when both of said reset signal from said data interruption detecting circuit and the temperature change detection signal from said temperature change detecting circuit are input to said AND circuit.

35. The burst mode optical transmitter circuit according to claim 3, further comprising a temperature change detecting circuit for detecting whether or not a temperature around said semiconductor laser has been changed within a predetermined period, and an AND circuit for providing a reset signal to said holding circuit only when both of said reset signal from said data interruption detecting circuit and the temperature change detection signal from said temperature change detecting circuit are input to said AND circuit.

36. The burst mode optical transmitter circuit according to claim 4, further comprising a temperature change detecting circuit for detecting whether or not a temperature around said semiconductor laser has been changed within a predetermined period, and an AND circuit for providing a reset signal to said holding circuit only when both of said reset signal from said data interruption detecting circuit and the temperature change detection signal from said temperature change detecting circuit are input to said AND circuit.

* * * * *